United States Patent
Takishima et al.

(10) Patent No.: US 6,655,581 B1
(45) Date of Patent: Dec. 2, 2003

(54) AUTOMATIC TELLER MACHINE

(75) Inventors: Kazuhiko Takishima, Yamanashi (JP); Kazuya Akiyama, Yamanashi (JP); Kazuo Miyashita, Yamanashi (JP); Kazuya Osada, Yamanashi (JP); Kenjirou Mizumoto, Yamanashi (JP); Takashi Matsuda, Tokyo (JP); Kouichi Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 333 days.

(21) Appl. No.: 09/590,368

(22) Filed: Jun. 9, 2000

(30) Foreign Application Priority Data

Jun. 11, 1999 (JP) .................................. 11-165413

(51) Int. Cl.⁷ .............................................. G06F 17/60
(52) U.S. Cl. ........................................................ 235/379
(58) Field of Search ................... 235/376, 482, 235/379, 380; 902/30, 35; 340/407, 711; 345/173, 170

(56) References Cited

U.S. PATENT DOCUMENTS 2,632,266 A * 3/1953 Sellwood .................... 116/205
4,488,146 A * 12/1984 Burchart .................... 340/407.2
4,608,485 A * 8/1986 Miura ......................... 235/379
4,620,816 A * 11/1986 Kupfer ............................ 404/6
5,185,515 A * 2/1993 Nishibe ....................... 235/379
5,302,049 A * 4/1994 Schmanski ..................... 404/15
5,412,189 A * 5/1995 Cragun ....................... 235/379
5,589,855 A * 12/1996 Blumstein et al. ........... 235/379
6,061,666 A * 5/2000 Do et al. ..................... 235/379

FOREIGN PATENT DOCUMENTS

JP          8-194856 A     7/1996
JP          11-95654 A     4/1999
JP          02000194502   *  7/2000 ........... G06F/3/033

* cited by examiner

Primary Examiner—Karl D. Frech
Assistant Examiner—Kimberly Nguyen
(74) Attorney, Agent, or Firm—Sughrue Mion, PLLC

(57) ABSTRACT

An ATM having a guide capability in which even a visually handicapped person who can not read braille type can positively operate a customer operating touch panel. An automatic teller machine includes a customer operating touch panel 2 having a plurality of operating keys which are touched for actuation. Guide icons 3 which are embossed to represent the icons of the operating keys are provided in the periphery of the customer operating touch panel at positions corresponding to said plurality of operating keys.

19 Claims, 12 Drawing Sheets

AUTOMATIC TELLER MACHINE

FIELD OF THE INVENTION

The present invention relates to an automatic teller machine (hereinafter referred to as "ATM") and in particular to an ATM having a capability which is suitable for operation by a visually handicapped person.

BACKGROUND OF THE INVENTION

A prior art ATM will be described with reference to FIG. 16. The ATM 1 comprises a customer operating touch panel 2 which is disposed on a table which is in the form of platen. Item keys 6 such as deposit, withdrawal, balance inquiry, passbook entry, cancel, yen/confirm, and barrier-free are initially displayed on the customer operating touch panel 2 as shown in FIG. 17. When any one of these item keys 6 is depressed, processing corresponding to the depressed item key 6 is enable. For example, when the item key 6 "withdrawal" is depressed, an array of numeric ten keys, a thousand digit key 5 and a ten thousand digit key 5 as shown in FIG. 18 are displayed. The array of numeric ten keys 4 is adapted to enter numerals 1 to 0, and a thousand digit key 5 and a ten thousands digit key 5 are adapted to enter the digit of a thousand and ten thousands, respectively.

Some prior art ATMs are provided with a guide capability using braille type 8 as shown in FIG. 18 for enabling the visually handicapped person to operate it. That is, braille types representing relevant numerals and characters are embossed along the edge of the customer operating touch panel 2 which is adjacent to the arrayed numeric ten keys 4 and a thousand digit key 5 and a ten thousand digit key 5.

SUMMARY OF THE DISCLOSURE

However, there is a problem that the visually handicapped person who is not capable of reading braille type can not operate the ATM through only guiding feature using braille type. Further, there is much to be desired even for the person capable of reading the braille type for operating the ATM alone without assistance of any other person. Namely, the braille type is limited only to the numeric keys and thus the item function keys cannot be operated without assistance of other person who can read them.

It is an object of the present invention to provide an ATM having a guiding capability, which enables a visually handicapped person which can not read braille type to positively operate a customer operating touch panel.

It is another object of the present invention to provide an ATM with a higher ease of operation for the visually handicapped person.

In accordance with a first aspect of the present invention, an automatic teller machine including a customer operating touch panel having a plurality of operating keys which are touched for actuation is wherein guide icons which are embossed to represent icons of operation keys (or function of each of operation keys) are provided at positions corresponding to said plurality of operation keys.

PREFERRED EMBODIMENTS

In a first embodiment, grooves on figured for guiding fingers, which extend from the guide icons to corresponding ones of the operating keys may be provided adjacent to the plurality of guide icons.

In a second embodiment, the plurality of operating keys may include item keys for specifying deposit, withdrawal, balance inquiry, passbook entry (or update), cancel, correct, confirm and barrier-free. The item keys are arrayed in a vertical direction on either sides of the customer operating touch panel and guiding projections (or grooves) may be provided adjacent to the guide icons corresponding to the item keys. The item for "confirm" may comprise "$/confirm" wherein "$" represents any other currency, e.g., Yen or Euro, £ etc.

In a third embodiment, the customer operating touch panel may be provided at part of an area of a table like platen, and the rest area of the table-like platen corresponding to the edge of the platen may be provided with a projecting rib which surrounds the rest area.

In a fourth embodiment, the plurality of operating keys may comprise arrayed numeric ten keys which are spaced for entry of numerals 0 to 9, and two keys for thousand digit and ten thousand digit adjacent to the arrayed numeric ten keys, which are spaced for entry of thousand and ten thousand digits, the numeric ten keys and thousand digit and ten thousand digit keys are arrayed in an array on the lower side of the customer operating touch panel. Grooves having a larger width may be provided at positions adjacent to the guide icons corresponding to the arrayed numeric ten keys and the guide icons corresponding to the thousand and ten thousand digit keys. The larger width is set larger than a spacing between the guide icons neighboring each other.

In a fifth embodiment, the plurality of operating keys may comprise arrayed numeric ten keys which are spaced for entry of numerals 0 to 9, and two keys for thousand digit and ten thousand digit adjacent to the arrayed numeric ten keys, which are spaced for entry of thousand and ten thousand digits. The arrayed numeric ten keys and thousand and ten thousand digit keys may be arrayed in an array on the lower side of the customer operating touch panel. Projecting guides having a width larger than a spacing between the guide icons may be provided adjacent to the guide icons corresponding to the arrayed numeric ten keys and the guide icons corresponding to the thousand and ten thousand digit keys.

In a sixth embodiment, a projection for identifying a boundary (interface) between the guide icons corresponding to the keys for entry of numerals "5" and "6" may be provided therebetween.

In a seventh embodiment, a braille type portion representing numerals, thousand digit and ten thousand digit may be provided between the arrayed numeric ten keys, the thousand and ten thousand digit key and a plurality of guide icons corresponding thereto.

DETAILED DESCRIPTION OF PREFERRED EMBODIMENTS

Figure 15:
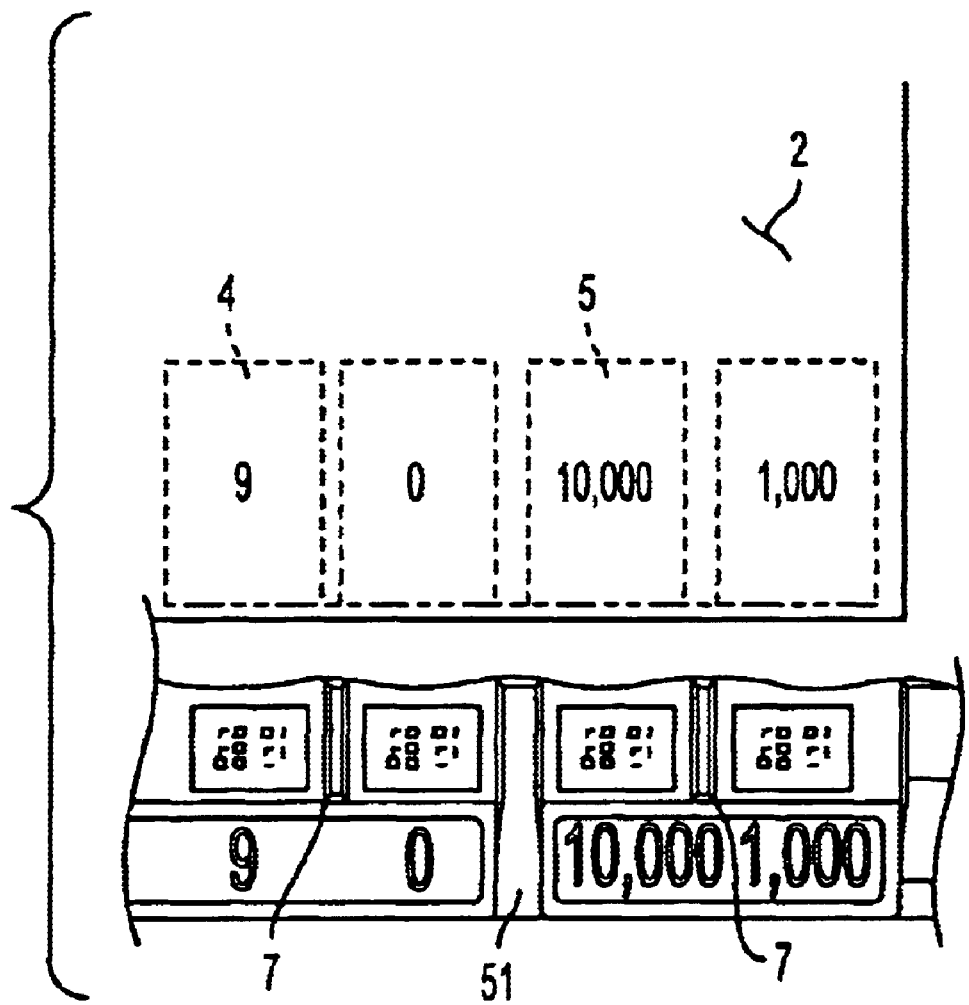
FIG. 15 A view showing the sixth embodiment of the present invention in which a part of arrayed numeric ten keys and thousand digit key and ten thousand digit key on the customer operating touch panel shown in FIG. 1 and its periphery are illustrated.
Figure 16:
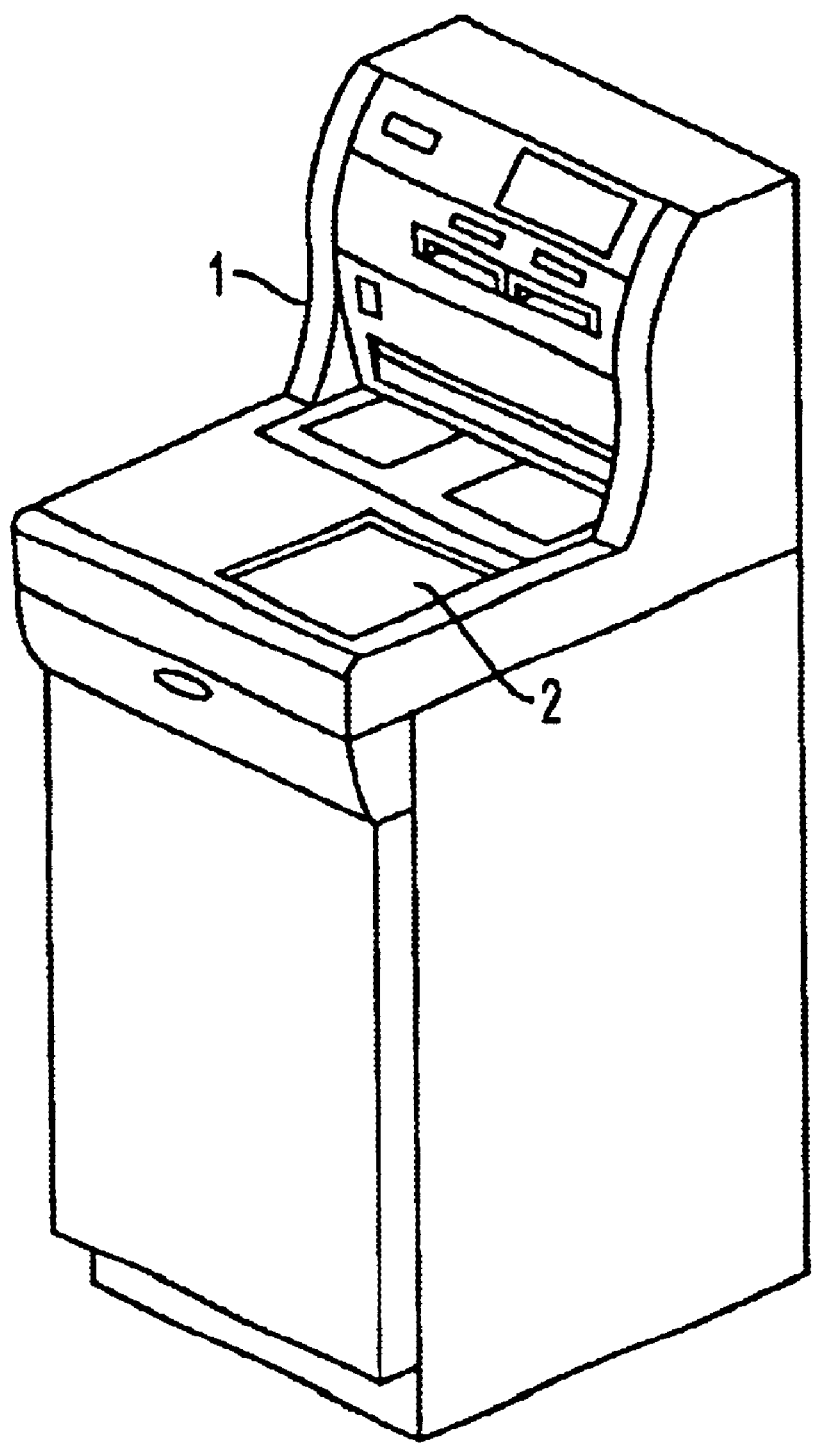
FIG. 16 A schematic view showing the appearance of the prior art ATM.
Figure 17:
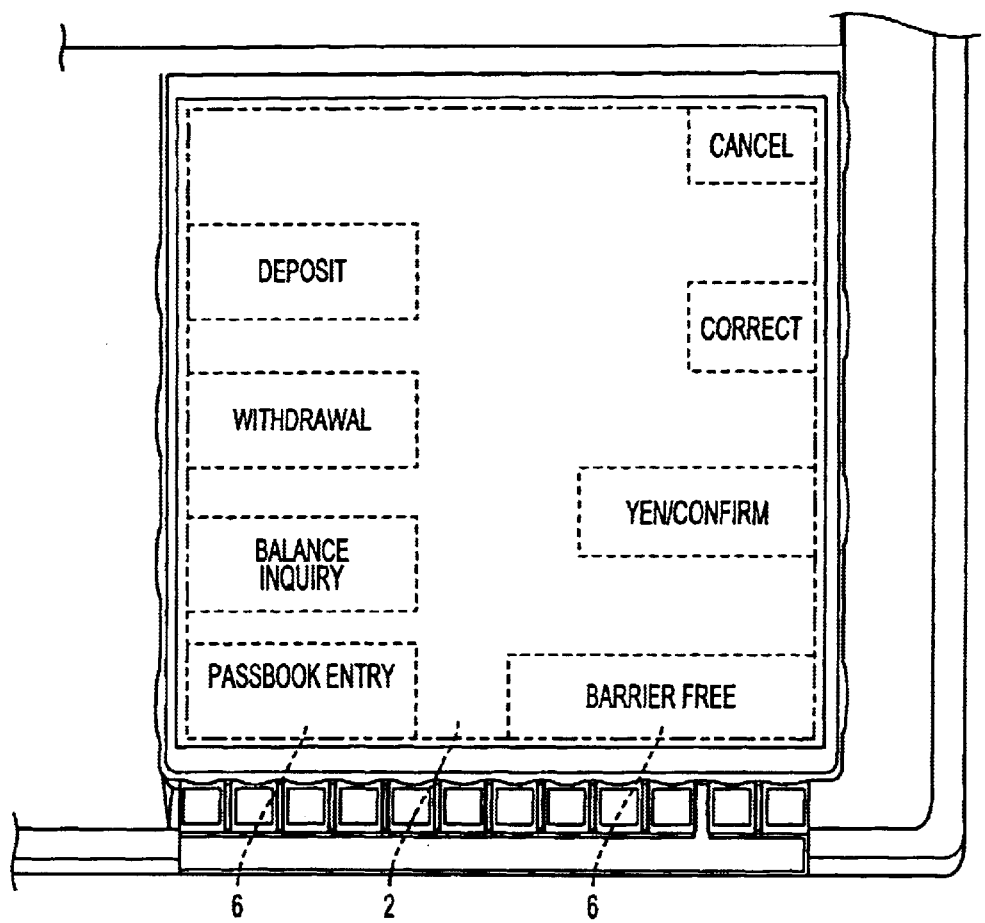
FIG. 17 A view showing the customer operating touch panel shown in FIG. 16 and its periphery.
Figure 18:
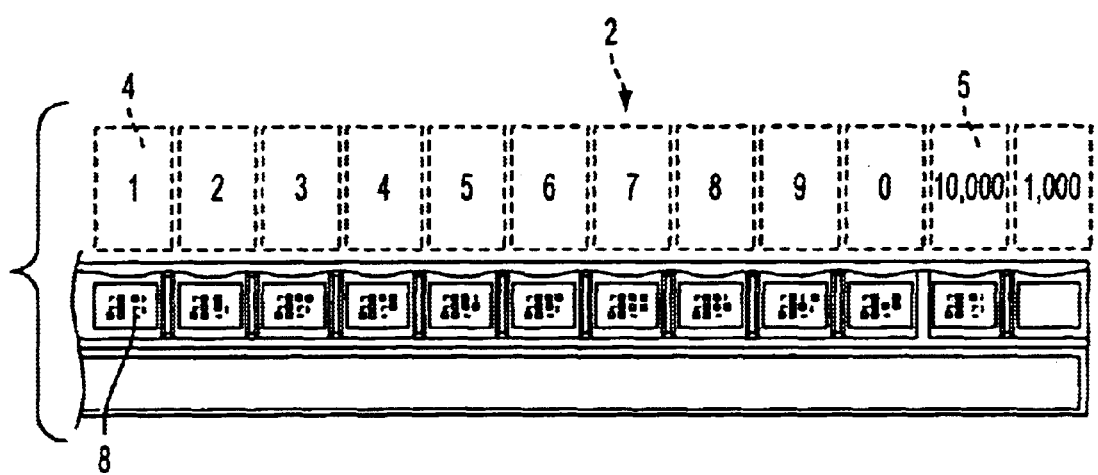
FIG. 18 A view showing the arrayed numeric ten keys and thousand digit and ten thousand digit keys and its periphery on the customer operating touch panel shown in FIG. 16.

Embodiments of the present invention will now be described with reference to the drawings. Elements shown in FIGS. 1 to 15 which are like to those in FIGS. 16 to 18 are represented by like numerals.

Figure 1:
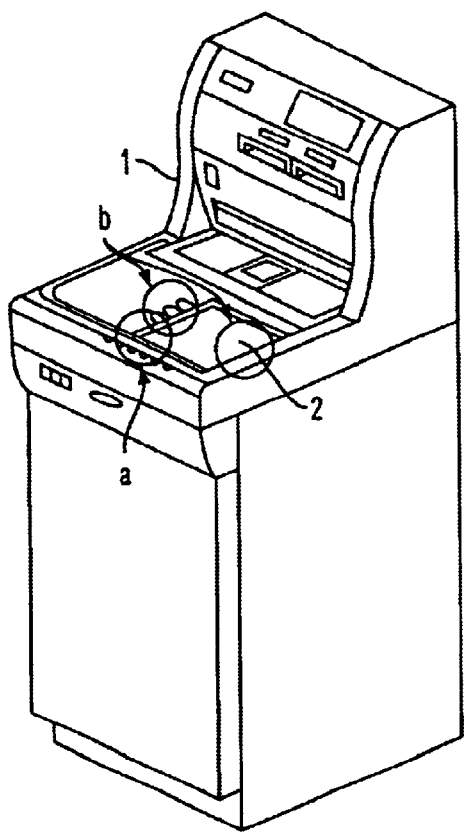
FIG. 1 A schematic view showing a general appearance of an ATM according to an embodiment of the present invention.

Referring now to FIG. 1, an ATM of the present invention has a feature in which various guide mechanisms are provided around the customer operating touch panel 2.

In the first embodiment of the present invention, the guide mechanisms are realized by providing around the customer operating touch panel 2 guide icons 3 which are embossed to symbolically represent item keys 6, arrayed numeric ten keys, a thousand digit key 5 and a ten thousand digit key 5.

Figure 2:
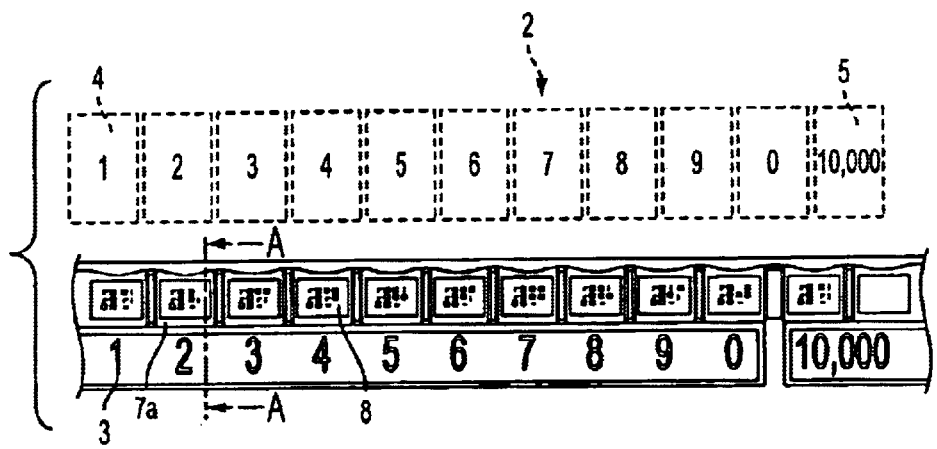
FIG. 2 A view showing a first embodiment of the present invention in which a part of arrayed numeric ten keys and thousand digit key and ten thousand digit key on a portion a of the customer operating touch panel shown in FIG. 1 and its periphery are illustrated.

In FIG. 2, the guide icons 3 for arrayed numeric ten keys 4 and a thousand digit key 5 and a ten thousand digit key 5 are provided corresponding to respective braille types 8 representing keys. In particular, the guide icons 3 for arrayed numeric ten keys 4 are embossed to represent relevant numerals and the guide icons 3 for a thousand digit key and a ten thousand digit key are embossed to represent the characters of thousand and ten thousands. The characters are typically in Japanese or Chinese characters of "Sen" (1,000) and "Man" (10,000) which may be replaced with any suitable other characters or symbols (or signs) expressed in any of other languages, e.g. "$10^3$" or "$10^4$"; "III " or "IV".

Figure 4:
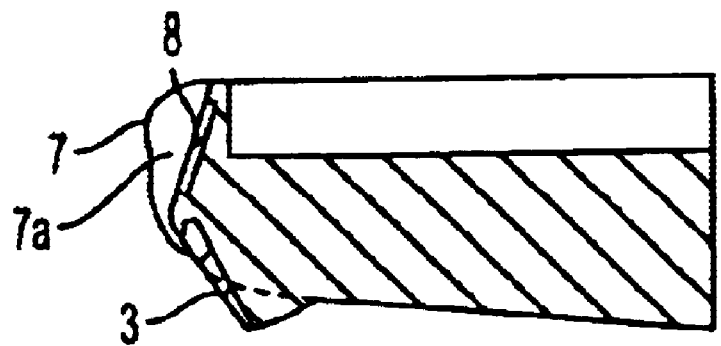
FIG. 4 A sectional view taken along the line A—A in FIG. 2.

FIG. 4 shows the section taken along the line A—A in FIG. 2. The braille types 8 are provided to be directed upward in a slightly inclined manner while the guide icons 3 for the arrayed numeric ten keys 4, a thousand digit key 5 and a ten thousand digit key 5 are provided to be directed downward in a slightly inclined manner. Guide portions 7 are provided by raising the opposite sides of each braille type 8. Guide grooves 7a are provided between the guide portions 7.

Figure 3:
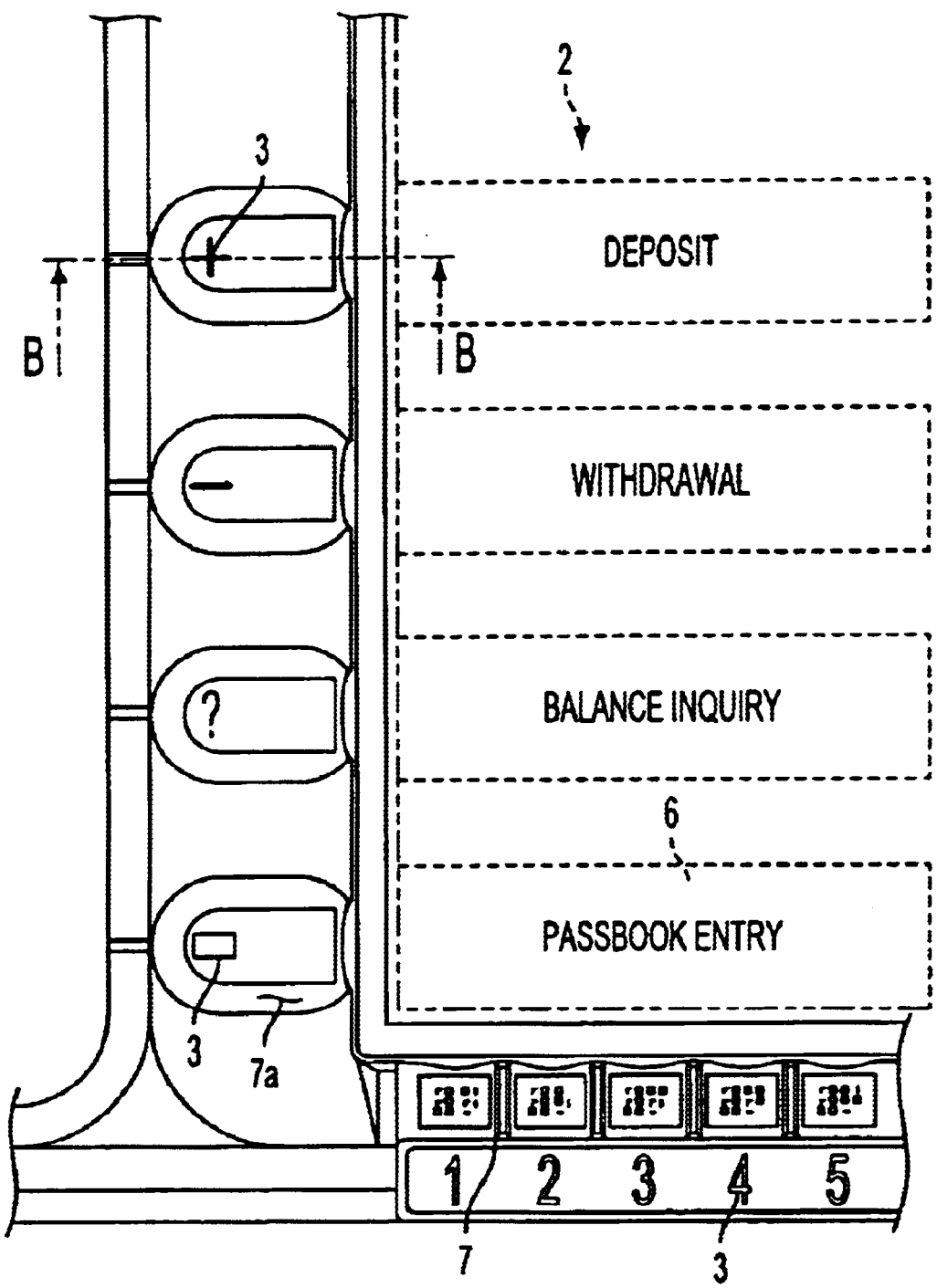
FIG. 3 A view showing the first embodiment of the present invention in which item keys on a portion b of the customer operating touch panel shown in FIG. 1 and its periphery are illustrated.

In FIG. 3, the guide icons 3 for the item keys 6 are provided just besides (left to) corresponding item keys 6, respectively. For example, marks (signs) such as plus (+), minus (−), question mark (?) and rectangular frame mark are embossed for the item keys such as deposit, withdrawal, balance inquiry and passbook entry (or update), respectively. Although not shown, cancel, correct, yen/confirm and barrier-free may be represented by marks (X), arrow, circle and eye mark, respectively, but are not limited to these marks.

Figure 5:
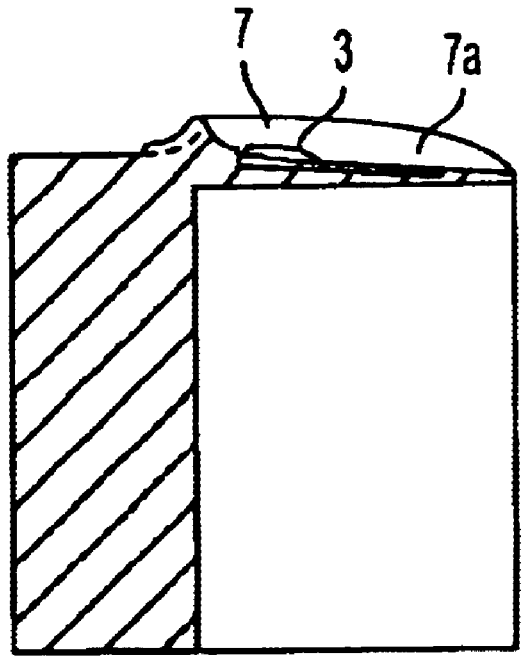
FIG. 5 A sectional view taken along the line B—B in FIG. 3.

FIG. 5 shows the section taken along the line B—B in FIG. 3. Also in this case, guide portions 7 are provided by raising the periphery of each guide icon 3, so that guide grooves are formed between the guide portions.

As shown in FIGS. 2 through 5, the guide icons 3 are embossed to symbolically represent arrayed numeric ten keys 4, a thousand digit key 5, a ten thousand digit key 5 and the item keys 6 as icons so that they can be identified with fingers. The guide grooves 7a extend from the guide icons 3 to the arrayed numeric ten keys 4, a thousand digit key 5, a ten thousand digit key 5 and item keys 6 on the customer operating touch panel 2.

Operation of the customer operating touch panel 2 will now be described. When an visually handicapped customer operates the customer operating touch panel 2 on the ATM in FIG. 1, voice guide for instructing the operation procedure is announced from the ATM 1. In FIGS. 2 and 3, the customer will touch the guide icons 3 (for selecting items) around the customer operating touch panel 2 with his or her fingers in accordance with the instruction of voice guide to identify the key to be operated from its shape. It is possible for the customer to positively depress the arrayed numeric ten keys, a thousand digit key, a ten thousand digit key and item keys 6 on the customer operating touch panel 2 by moving his or her finger along the guide groove 7. Accordingly, even the visually handicapped person who can not read braille type can conduct the key entry operation. Since the guide portions for the arrayed numeric ten keys 4, a thousand digit key and a ten thousand digit key 5 are disposed linearly, only leftward and rightward movement of a finger is required to search the icon.

Ease of operation is thus improved.

Figure 6:
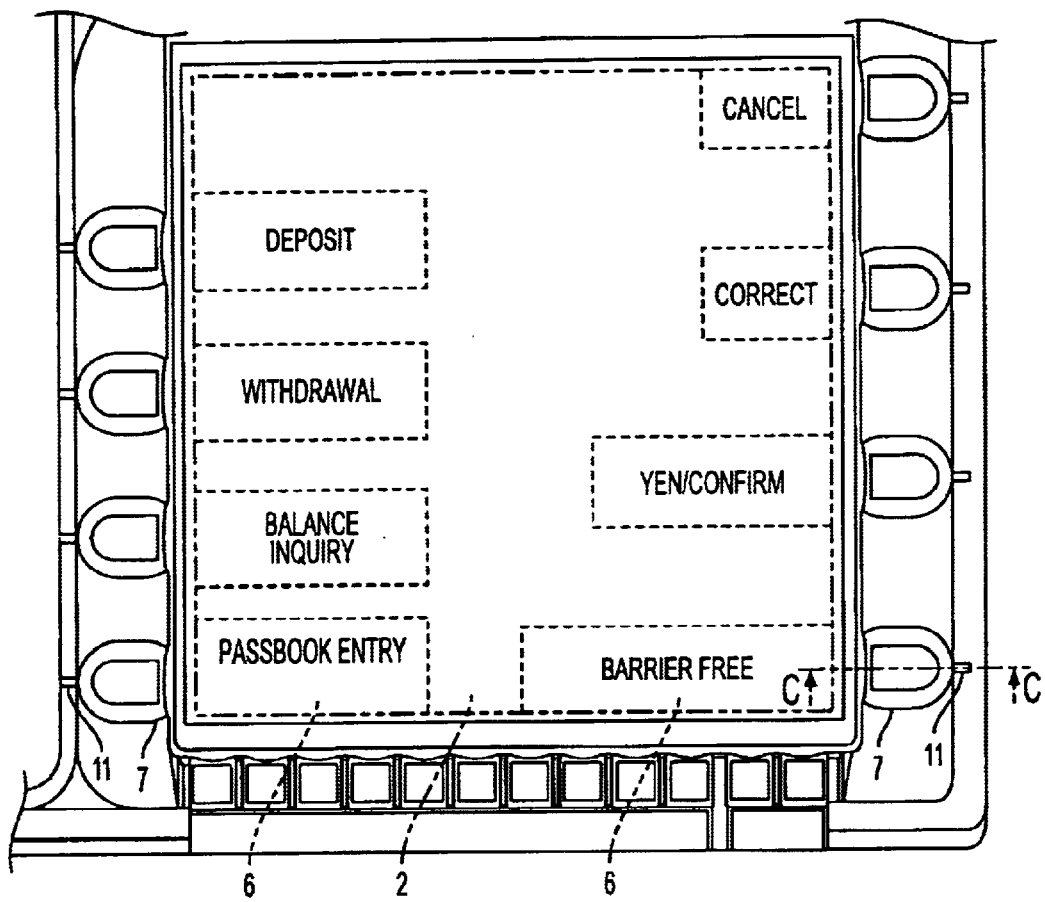
FIG. 6 A view showing the second embodiment of the present invention in which the customer operating touch panel shown in FIG. 1 and its periphery are illustrated.
Figure 7:
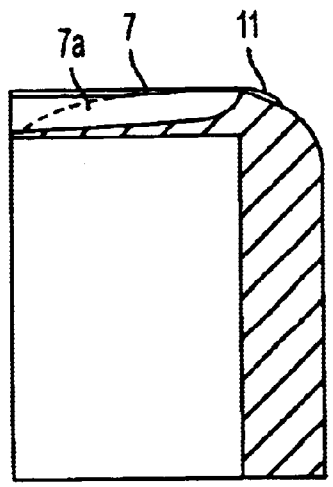
FIG. 7 A sectional view taken along the line C—C in FIG. 6.

A second embodiment is described with reference to FIGS. 3, 6 and 7. In this embodiment, it is possible for the visually handicapped person to identify the position of the item key 6 quickly by providing the guide projections 11 adjacent to the guide icons for the item keys 6 in the periphery of the customer operating touch panel 2.

Four guide projections 11 are provided on each of the right and left sides of the customer operating touch panel 2 so that one of the projections 11 corresponds to each of item keys 6. The guide projections 11 have such a shape that they can be identified with fingers as shown in FIGS. 6 and 7. The guide grooves 7a extends from the guide projections 11 to the item key 6 on the customer operating touch panel 2. For clarity, the guide icons 3 which are shown in FIG. 3 are omitted in FIGS. 6 and 7.

When the visually handicapped customer operates the customer operating touch panel 2 on the ATM 1, voice guide for instructing the operation procedure is announced from the ATM 1. In FIG. 6, the customer touches the guide projections 11 on the right and left sides of the customer operating touch panel 2 according to the instruction of the announced voice guide for identifying the position and for moving his or her fingers, so that the customer can depress a desired item key 6. Since the guide projections 11 have the shape which can be identified with fingers as shown in FIGS. 6 and 7, the customer can quickly identify the order of the arrayed guide projections 11 and their positions and can depress any of the desired item keys 6.

Now, a third embodiment of the present invention will be described with reference to FIGS. 1, 8, 9 and 10. In this embodiment, a coin ridge (coin-blocking rib-like barrier) 20 is provided on a table in which the customer operating touch panel 2 is disposed so that it may be used as coin tray and hook for stick and umbrella. It can be also used as a grip for the handicapped person for dragging a wheelchair toward the ATM 1 when the handicapped person rides on the wheelchair.

Figure 8:
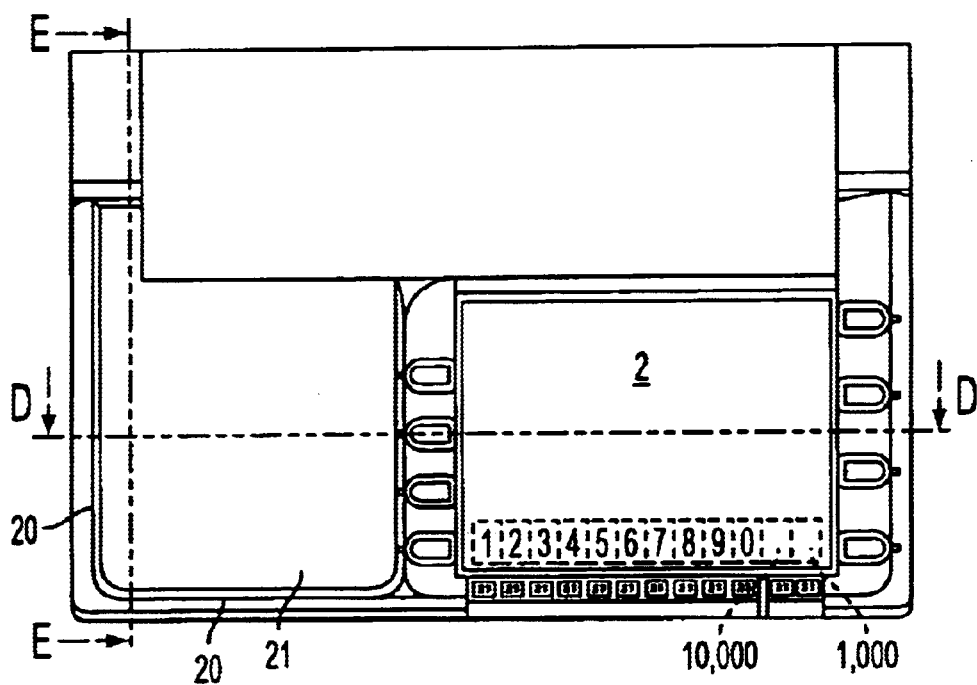
FIG. 8 A view showing the third embodiment of the present invention in which the customer operating touch panel shown in FIG. 1 and its periphery are illustrated.
Figure 9:
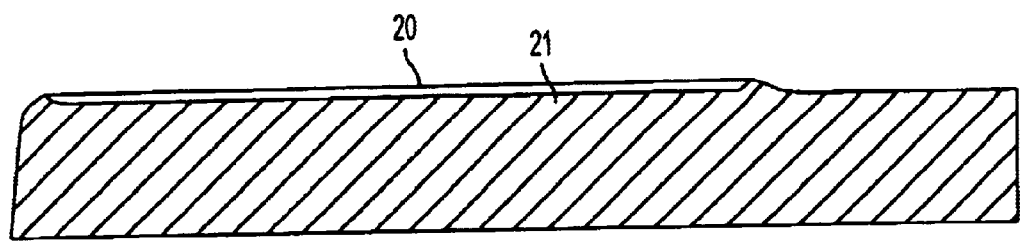
FIG. 9 A sectional view taken along the line D—D in FIG. 8.
Figure 10:
FIG. 10 A sectional view taken along the line E—E in FIG. 8.

In FIG. 8, the customer operating touch panel 2 is disposed on the right side of the table so that deposit, withdrawal and the other operations are possible. The coin ridge 20 is provided along the left edge of the table to define a small table 21 within the coin ridge 20. The small table 21 can be used as elbow rest or a tray on which small articles such as banknotes, a purse and a bag are placed. Since the coin ridge 20 is formed to surround the small table 21, it prevents banknotes, purses and bags from falling down.

While the visually handicapped customer performs a deposit or withdrawal operation, the customer can confirm the amount and kinds of coins which are placed on the small table 21 or can hook his or her stick or umbrella on the coin ridge 20. When the customer uses an wheelchair, he or she can move the wheelchair toward the ATM by grabbing the coin ridge 20.

Figure 11:
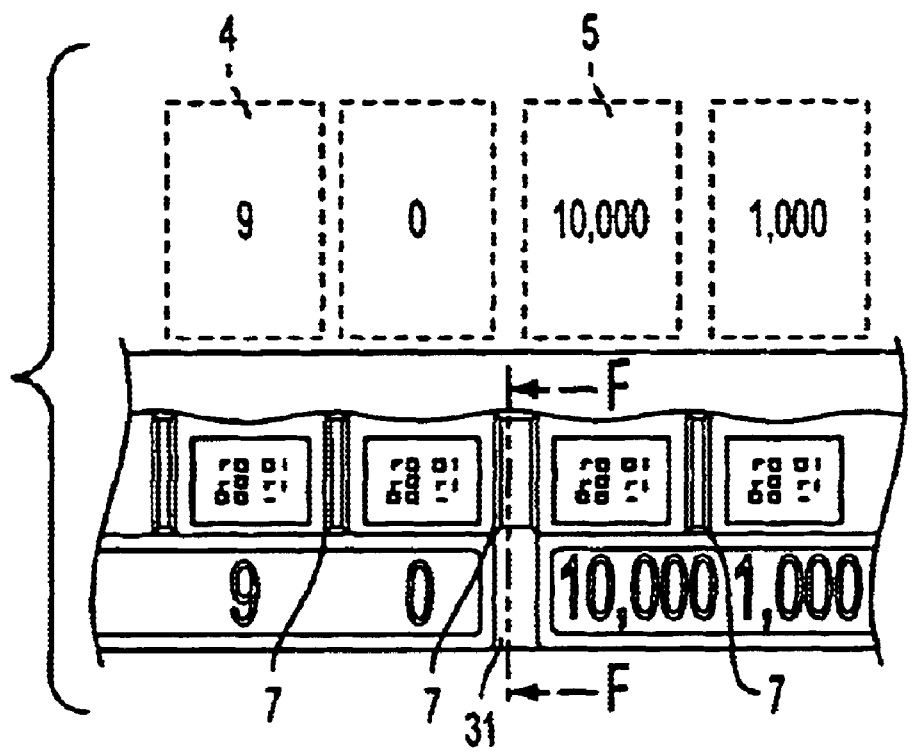
FIG. 11 A view showing the fourth embodiment of the present invention in which a part of arrayed numeric ten keys and thousand digit key and ten thousand digit key on the customer operating touch panel shown in FIG. 1 and its periphery are illustrated.
Figure 12:
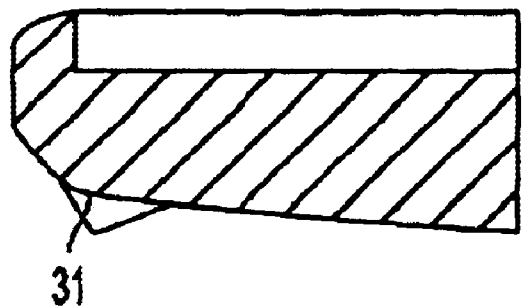
FIG. 12 A sectional view taken along the line F—F in FIG. 11

A fourth embodiment of the present invention will be described with reference to FIGS. 11 and 12. In this embodiment, ease of identification when operating the arrayed numeric ten key 4, a thousand digit key and a ten thousand digit key 5 is improved by providing grooves 31 between the guides 7 of the arrayed numeric ten keys 4 and the thousand digit key and the ten thousand digit key 5 for increasing the distance (interval) therebetween, so that it is possible for the visually handicapped person to quickly conduct the key entry.

This contemplates to overcome the problem of the prior art ATM in that it is difficult for the visually handicapped person who can not read braille type to make difference between the arrayed numeric ten keys 4, and the thousand digit and ten thousand digit keys 5 since the spacing between the braille types 8 for the arrayed numeric ten keys 4 is equal to that of the thousand digit and ten thousand digit keys 5.

Entry of numerals and digit is possible by depressing the arrayed numeric ten keys 4 and the thousand digit and ten thousand digit keys 5 on the customer operating touch panel 2 as mentioned above. The guides 7 for guiding the arrayed numeric ten keys 4 comprises ten grooves 7a for riding the finger to respective keys on entry of the numerals 0 through 9. The guides 7 for the thousand digit key and the ten thousand digit key 5 comprise two grooves 7a for guiding the finger(s) to respective keys on entry of the digits of thousand and ten thousands. The guides 7 for the arrayed numeric ten keys 4 are separated from the guides 7 for the thousand digit key and the ten thousand digit key 5 by means of a groove 31 having a large width.

As mentioned above, voice guide for instructing the operation procedure is announced from the ATM 1 when the visually handicapped customer operates the touch panel 2 on the ATM 1. The customer finds the groove 31 having a large width between the guide 7 for the arrayed numeric ten keys 4 and the guide 7 for the thousand digit key and ten thousand digit key 5 in the periphery of the customer operating touch panel 2 in accordance with the instruction of the voice guide and moves the finger along the guide groove 7a for the arrayed numeric ten keys 4 on the left side of the panel for entry of the numerals 0 to 9 and can positively depress the desired key of the arrayed numeric ten keys 4 on the touch panel 2. Similarly, the customer can positively depress the thousand digit and ten thousand digit keys 5 by moving the finger along the guide groove 7a for the thousand digit and ten thousand digit keys 5 on the right side of the groove 31.

Ease of identification between the arrayed numeric ten keys 4 and the thousand digit key and ten thousand digit key 5 when touching with a finger is improved due to the fact that the groove 31 is provided between the guide 7 for the arrayed numeric ten keys 4 and the guide 7 for the thousand digit key and ten thousand digit key 5 to increase the distance therebetween so that the key entry by the visually handicapped person can be quickly conducted.

Figure 13:
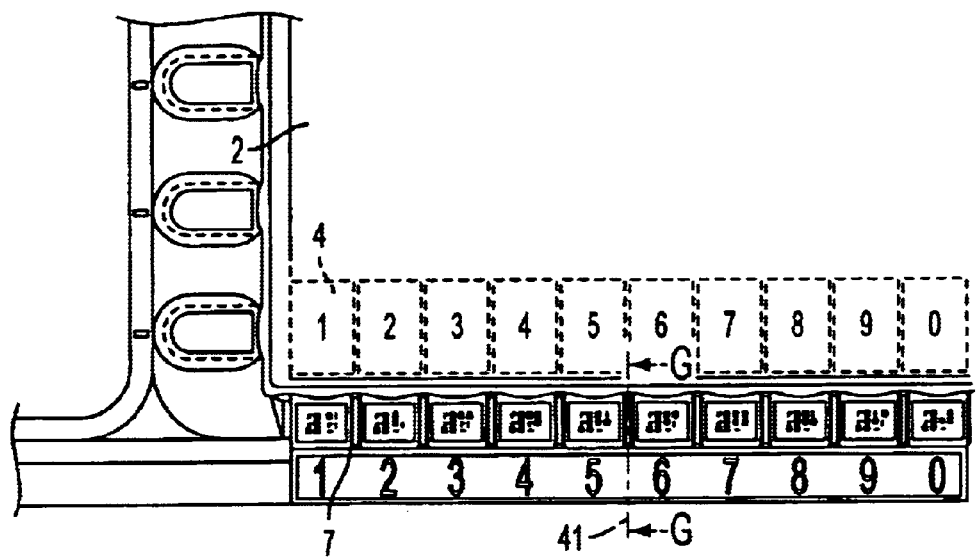
FIG. 13 A view showing the fifth embodiment of the present invention in which item keys on the customer operating touch panel shown in FIG. 1 and its periphery are illustrated.
Figure 14:
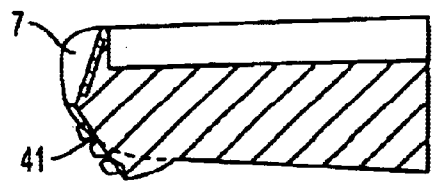
FIG. 14 A sectional view taken along the line G—G in FIG. 13.

A fifth embodiment of the present invention will be described with reference to FIGS. 13 and 14. In the embodiment, the key entry operation by the visually handicapped person can be quickly and positively conducted by making the shape of the guide between the fifth and sixth keys 4 in the periphery of the customer operating touch panel 2 different from that of the other guide.

As mentioned above, entry of numeral is possible by depressing each key of the arrayed numeric ten keys 4 on the touch panel 2. The guide 7 for the arrayed numeric ten keys 4 comprises ten grooves 7a for guiding the finger to respective keys on entry of the numerals 0 to 9. In the present embodiment, a projection 41 is provided between the guide 7 for forming the fifth groove and the guide 7 for forming the sixth groove.

When the visually handicapped customer operates the touch panel 2 on the ATM 1, voice guide for instructing the operation procedure is announced from the ATM 1. On operation of the arrayed numeric ten keys 4 on the touch panel 2, the customer touches the projection 41 adjacent to the arrayed numeric ten keys 4 to notice that the group of numerals 1 to 5 is separated from the group of numerals 6 to 0 by the projection 41. Accordingly, if the customer moves his or her finger along the guide groove 7a for the arrayed numeric ten keys 4, the customer can quickly and positively conduct an operation of entry of numerals on the customer operating touch panel 2.

In such a manner, the visually handicapped person touches the projection 41 adjacent to the guide 7 for the arrayed numeric ten keys 4 in accordance with voice guide to notice that the group of the numerals 1 to 5 is separated from that of 6 to 0 by the projection 41. There is an advantage that the necessary numeral can be found faster than the case in which no projection 41 is provided.

A sixth embodiment of the present invention will be described with reference to FIG. 15. In the present embodiment, ease of identification is improved by providing a wide guide 51 between the guide 7 for the arrayed numeric ten keys 4 and the guide 7 for the thousand digit key and the ten thousand digit key 5 so that the visually handicapped person can quickly conduct key entry. The difference between the sixth and fourth embodiments resides in that the ease of identification is improved by providing a wider groove (concave) 31 in the fourth embodiment whereas the ease of identification is improved by providing a wider guide (convex, protrusion) 51 in the sixth embodiment.

As mentioned above, entry of numeral is possible by depressing each of the arrayed numeric ten keys 4 on the touch panel 2. The guide 7 for the arrayed numeric ten keys 4 comprises ten grooves 7a for guiding the finger to respective keys on entry of the numerals 0 to 9. The guides 7 for the thousand digit key and ten thousand digit key 5 comprise two grooves 7a for guiding the finger to respective keys on entry of the thousand digit or ten thousand digit. The guide 7 for the arrayed numeric ten keys 4 is separated from the guide 7 for the thousand digit key and the ten thousand digit key 5 by the guide 51 having a larger width.

As mentioned above, voice guide for instructing the operation procedure is announced from the ATM 1 when the visually handicapped customer operates the touch panel 2 on the ATM 1. The customer finds the guide 51 having a large width between the guide 7 for the arrayed numeric ten keys 4 and the guide 7 for the thousand digit key and ten thousand digit key 5 in the periphery of the customer operating touch panel 2 in accordance with the instruction of the voice guide and moves the finger along the guide groove 7a for the arrayed numeric ten keys 4 on the left side of the panel for entry of the numerals 0 to 9 and can positively depress the desired key of the arrayed numeric ten keys 4 on the touch panel 2. Similarly, the customer can positively depress the thousand digit and ten thousand digit keys 5 by moving the finger along the guide groove 7a for the thousand digit and ten thousand digit keys 5 on the right side of the guide 51.

The meritorious effects of the present invention are summarized as follows.

As mentioned above, in accordance with the present invention, there is provided an ATM having a guide capability, in which even a visually handicapped person can positively operate a customer operating touch panel to enhance the serviceability.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An automatic teller machine comprising:
    a customer operating touch panel having an operating key which is touched for actuation;
    a guide icon, embossed to represent a function of said operating key, provided at a position corresponding to said operating key; and
    means for guiding an operator from said guide icons to said operating keys.

2. The automatic teller machine as defined in claim 1, wherein a plurality of said operating keys and said guide icons are provided, and said plurality of operating keys comprise at least deposit, withdrawal, balance inquiry, passbook entry, cancel, correct and confirm.

3. The automatic teller machine as defined in claim 2, wherein said operating keys further comprise barrier-free.

4. The automatic teller machine as defined in claim 2, wherein said operating key "confirm" comprises "$/confirm".

5. The automatic teller machine as defined in claim 1, wherein a plurality of said operating keys and said guide icons are provided, along with a voice guide unit that instructs how to use said guide icons.

6. The automatic teller machine as defined in claim 5, wherein said means for guiding an operator comprises one or both of a groove of a projection extending between respective ones of said operating keys and said guide icons; and
    said voice guide unit comprises a guidance explanation of the guide icons item by item and a guidance to follow guiding projections and/or grooves to reach a desired one of said operation key on said touch panel.

7. An automatic teller machine comprising:
    a customer operating touch panel having an operating key which is touched for actuation;
    a guide icon, embossed to represent a function of said operating key, provided at a position corresponding to said operating key; and
    a groove configured for guiding fingers, wherein
        said groove extends from said guide icon to said operating key to guide an operator's finger.

8. The automatic teller machine as defined in claim 7, wherein a plurality of said operating keys, said guide icons and said grooves are provided, and said plurality of operation keys comprise item keys for specifying deposit, withdrawal, balance inquiry, passbook entry, cancel, correct, confirm and barrier-free,
    said item keys are arrayed in a vertical direction on either sides side of said customer operating touch panel, and
    said automatic teller machine further comprises guiding projections provided adjacent to said guide icons corresponding to said operating keys.

9. The automatic teller machine as defined in claim 8, wherein said operating key "confirm" comprises "$/confirm".

10. The automatic teller machine as defined in claim 7, wherein a plurality of said operating keys, said guide icons and said grooves are provided,
    said plurality of operating keys comprise arrayed numeric ten keys which are spaced for entry of numerals 0 to 9, and two keys for thousand digit and ten thousand digit adjacent to the arrayed numeric ten keys, which are spaced for entry of thousand and ten thousand digits,
    said numeric ten keys and thousand digit and ten thousand digit keys being arrayed in an array on a lower side of said customer operating touch panel, and
    said plurality of grooves having a larger width are provided at positions adjacent to the guide icons corresponding to the arrayed numeric ten keys and the guide icons corresponding to the thousand and ten thousand digit keys, said larger width being larger than a spacing between said guide icons.

11. The automatic teller machine as defined in claim 10, wherein a projection for identifying a boundary between the guide icons corresponding to the keys for entry of numerals "5" and "6" is provided therebetween.

12. The automatic teller machine as defined in claim 11, wherein a braille type portion representing numerals, thousand digit and ten thousand digit is provided between said arrayed numeric ten keys, said thousand and ten thousand digit key and a plurality of guide icons corresponding thereto.

13. The automatic teller machine as defined in claim 7, wherein a plurality of said operating keys, said guide icons and said grooves are provided,
    said plurality of operating keys comprise arrayed numeric ten keys which are spaced for entry of numerals 0 to 9, and two keys for thousand digit and ten thousand digit adjacent to the arrayed numeric ten keys, which are spaced for entry of thousand and ten thousand digits, said arrayed numeric ten keys and thousand and ten thousand digit keys are arrayed in an array on a lower side of said customer operating touch panel, and projecting guides having a width larger than a spacing between the guide icons are provided adjacent to the guide icons corresponding to the arrayed numeric ten keys and the guide icons corresponding to the thousand and ten thousand digit keys.

14. An automatic teller machine comprising:

a customer operating touch panel having an operating key which is touched for actuation;

a guide icon, embossed to represent a function of said operating key, provided at a position corresponding to said operating key; and wherein said customer operating touch panel is provided at part of an area of a platen, and a rest area of said platen is provided with a projecting rib which surrounds said rest area.

15. An automatic teller machine comprising:

a customer operating touch panel having an operating key which is touched for actuation;

a guide icon, embossed to represent a function of said operating key, provided at a position corresponding to said operating key; and a guiding projection or projections configured for guiding fingers, wherein
said guiding projection extends from said guide icon, to said operating key.

16. An automatic teller machine comprising a customer operating touch panel having a plurality of operating keys which are touched for actuation, wherein guide icons which are embossed to represent icons of operation keys are provided at positions corresponding to said plurality of operation keys, wherein a groove or grooves configured for guiding fingers, which extend from said guide icons to corresponding ones of said operating keys are provided adjacent to said plurality of guide icons;

wherein said plurality of operating keys comprise arrayed numeric ten keys which are spaced for entry of numerals 0 to 9, and two keys for thousand digit and ten thousand digit adjacent to the arrayed numeric ten keys, which are spaced for entry of thousand and ten thousand digits, said numeric ten keys and thousand digit and ten thousand digit keys being arrayed in an array on a lower side of said customer operating touch panel, and grooves having a larger width are provided at positions adjacent to the guide icons corresponding to the arrayed numeric ten keys and the guide icons corresponding to the thousand and ten thousand digit keys, said larger width being larger than a spacing between said guide icons.

17. The automatic teller machine as defined in claim 16, wherein a projection for identifying a boundary between the guide icons corresponding to the keys for entry of numerals "5" and "6" is provided therebetween.

18. The automatic teller machine as defined in claim 17, wherein a Braille type portion representing numerals, thousand digit and ten thousand digit is provided between said arrayed numeric ten keys, said thousand and ten thousand digit key and a plurality of guide icons corresponding thereto.

19. An automatic teller machine comprising a customer operating touch panel having a plurality of operating keys which are touched for actuation, wherein guide icons which are embossed to represent icons of operation keys are provided at positions corresponding to said plurality of operation keys, wherein a groove or grooves configured for guiding fingers, which extend from said guide icons to corresponding ones of said operating keys are provided adjacent to said plurality of guide icons;

wherein said plurality of operating keys comprise arrayed numeric ten keys which are spaced for entry of numerals 0 to 9, and two keys for thousand digit and ten thousand digit adjacent to the arrayed numeric ten keys, which are spaced for entry of thousand and ten thousand digits, said arrayed numeric ten keys and thousand and ten thousand digit keys are arrayed in an array on a lower side of said customer operating touch panel, and projecting guides having a width larger than a spacing between the guide icons are provided adjacent to the guide icons corresponding to the arrayed numeric ten keys and the guide icons corresponding to the thousand and ten thousand digit keys.

* * * * *